United States Patent
Sommer

(10) Patent No.: US 7,302,314 B2
(45) Date of Patent: Nov. 27, 2007

(54) VEHICLE CONTROLLER AND CONTROL METHOD

(75) Inventor: Rainer Sommer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 865 days.

(21) Appl. No.: 10/045,789

(22) Filed: Jan. 11, 2002

(65) Prior Publication Data

US 2002/0111719 A1 Aug. 15, 2002

(30) Foreign Application Priority Data

Jan. 12, 2001 (DE) ................................ 101 01 311

(51) Int. Cl.
*G01M 17/00* (2006.01)

(52) U.S. Cl. ............................. 701/1; 701/32; 701/33; 701/36; 701/48

(58) Field of Classification Search .................... 701/1, 701/32, 33, 36, 48
See application file for complete search history.

(56) References Cited

U.S. PATENT DOCUMENTS

| | | | | |
|---|---|---|---|---|
| 5,513,107 | A * | 4/1996 | Gormley ...................... | 701/48 |
| 5,568,388 | A * | 10/1996 | Schnerer et al. ............... | 701/1 |
| 6,061,617 | A * | 5/2000 | Berger et al. ................. | 701/50 |
| 6,167,337 | A * | 12/2000 | Haack et al. ................. | 701/50 |
| 6,184,661 | B1 * | 2/2001 | Becker et al. ................ | 322/25 |
| 6,269,300 | B1 * | 7/2001 | Moore-McKee et al. ... | 701/102 |
| 6,360,145 | B1 * | 3/2002 | Robinson ...................... | 701/35 |
| 6,529,805 | B2 * | 3/2003 | Aldrich et al. ................. | 701/1 |
| 6,708,096 | B1 * | 3/2004 | Frei et al. ..................... | 701/53 |
| 2001/0044677 | A1 * | 11/2001 | Bauer et al. .................. | 701/1 |

FOREIGN PATENT DOCUMENTS

| | | |
|---|---|---|
| DE | 38 02 241 | 8/1989 |
| DE | 41 22 203 | 1/1992 |
| DE | 41 28 922 | 3/1992 |
| DE | 41 11 949 | 10/1992 |
| EP | 0 872 395 | 10/1998 |
| JP | 64-86272 | 3/1989 |

OTHER PUBLICATIONS

Volkswagen Official Factory Repair Manual, Golf, GTI, Jetta 1999-2003, Jetta Wagon 2001-2003; Bentley Publishers; pp. 1- through 1-64.*

* cited by examiner

*Primary Examiner*—Thomas Black
*Assistant Examiner*—Brian J. Broadhead
(74) *Attorney, Agent, or Firm*—Kenyon & Kenyon LLP

(57) ABSTRACT

A vehicle controller and a control method, which is designed for a plurality of different vehicle versions, including: means for storing a plurality of control parameters for different vehicle versions, means for storing a version coding for personalizing the vehicle controller for a predetermined vehicle version, the version coding having a number of bit positions, and means for indirect selection of control parameters from the control parameter storage means by algorithmic processing of the values of several bit positions of the version coding.

12 Claims, 1 Drawing Sheet

VEHICLE CONTROLLER AND CONTROL METHOD

FIELD OF THE INVENTION

The present invention relates to a vehicle controller and a control method, each designed for a plurality of different types of vehicles.

BACKGROUND INFORMATION

A controller is described in German Patent Application No. 38 02 241, for example. This electronic controller has a code memory for at least one code word for definition of the respective individual design version of the respective vehicle, the respective program sections, data records, input and/or output channels being directly controllable as a function of the code word contained in the code memory. The totality of all program sections, data records, input and/or output channels for all vehicle versions is stored uniformly in each controller. The controller described there is customized as follows for a certain vehicle design version. The first bit of the code word controls a system demand control over an absolute pressure sensor or, alternatively, a system demand control over a load signal from the air flow meter; the second bit activates an idling control having an idling characteristic curve which depends on engine rpm and load or, alternatively, an idling control having an idling characteristic curve contact selection; the third bit determines whether or not an overrun fuel cutoff is to be activated, preferably using a firing angle change limitation; the fourth bit provides for an alternative choice between an ignition control having two engine characteristics maps with load gradient-dependent switching and an ignition control having one engine characteristics map with the respective idling characteristic curve, etc. One of two alternatives is thus specified by each bit of the code word, and the respective parameter or the respective engine characteristics map is selected from the totality of data stored in the controller as a function of the alternative determined by the respective bit. The assignment of a bit of the code word to a parameter or an engine characteristics map is thus made directly.

SUMMARY OF THE INVENTION

A first aspect of the present invention provides a vehicle controller and a control method with which control parameters of a vehicle version can be determined from a version coding without specifying this directly through a separate bit in the code word according to the version coding. These parameters are determined by algorithmic processing of the version coding during operation in the controller. This determination is thus indirect. One advantage of the present invention is that more different vehicle versions or equipment elements can be differentiated with the same code word length.

If it is important to save on storage space for different parameter sets in the controller, then according to another aspect of the present invention, parameters may also be contained directly in the code word according to version coding. In this case, these parameters are determined directly from the code word.

These two aspects may also be combined in one controller. Thus, individual parameters (or engine characteristics maps) may be determined by indirect selection and additional parameters (or engine characteristics maps) can be read out directly in the code word. In addition, parameters (or engine characteristics maps) may be determined by direct selection from the version coding.

DETAILED DESCRIPTION

Figure 1:
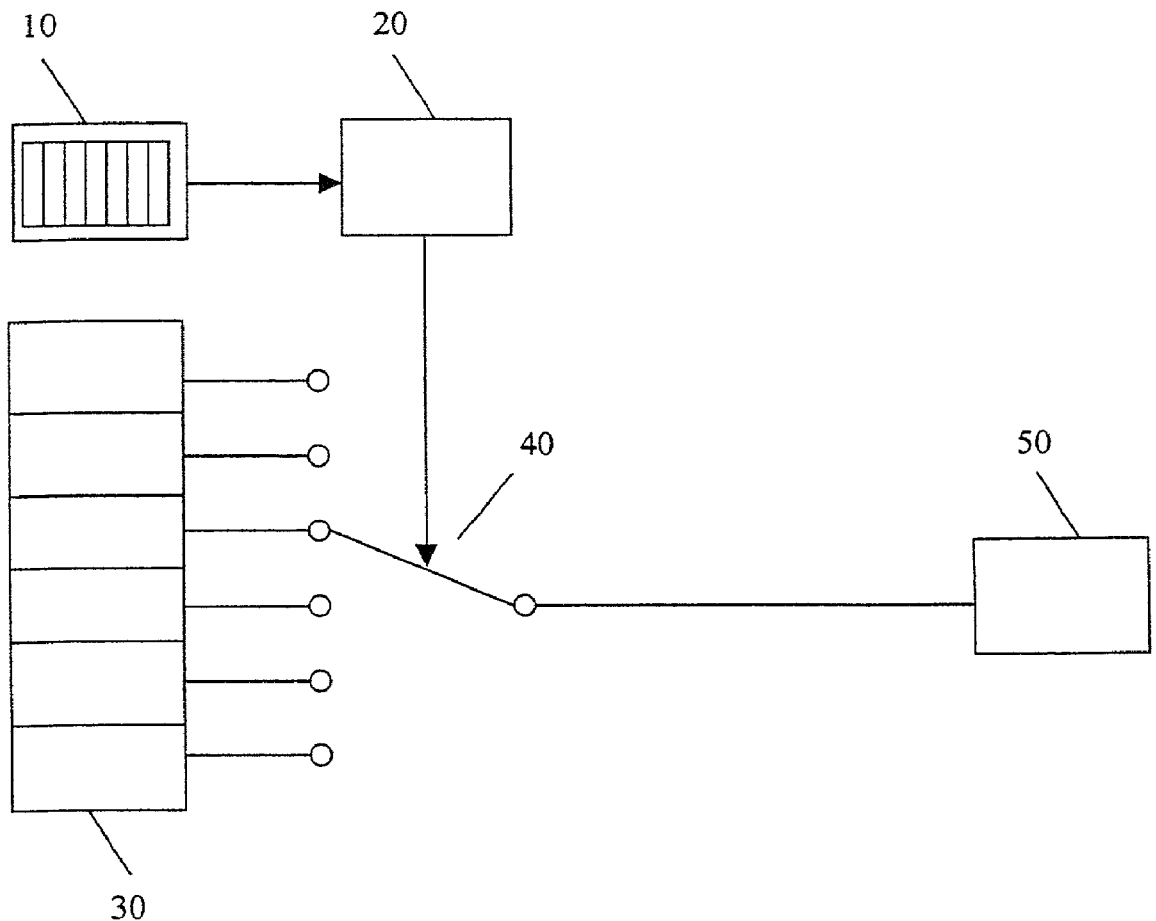
FIG. 1 shows a first embodiment according to the present invention.

FIG. 1 shows a vehicle controller according to the present invention having a code word memory 10, a processing unit for algorithmic processing of version coding 20, a memory for application data 30, a selector unit 40 and a control unit 50. Code word memory 10 is intended to hold the version coding, so it contains information regarding the vehicle version, i.e., information regarding the vehicle allocated to the controller. The information may include the presence, type and nature of individual vehicle components, such as body type, engine type, transmission type, carburetor type, etc. Code word memory 10 may be implemented as an EEPROM. Data or engine characteristics maps for the individual elements of the vehicle equipment are contained in application data memory 30.

Depending on the content of code word memory 10, data according to the respective version is read out of application data memory 30 in operation of the vehicle controller. Individual values of application data memory 30 may be allocated directly to individual items of information in version code memory 10 or they may be allocated indirectly, i.e., individual values are assigned to certain combinations of information of code word memory 10. These combinations are determined by logic links of individual bit positions of version code memory 10. The links are formed in unit 20. According to the algorithmic processing in unit 20, selector unit 40 is then controlled to access the respective memory locations in application data memory 30. The value read there is sent to control unit 50. In control unit 50, the proper control program for the vehicle control is executed. Many parameters or engine characteristics maps can be determined from the version coding in the manner described here.

Since the totality of possible values and engine characteristics maps is present in each controller, such a controller may be used for a plurality of different vehicle versions. Thus only the version coding stored in version code memory 10 is version specific. This version coding may be stored at the time of manufacture of the vehicle. The data may also be revised later, e.g., as part of maintenance work. Thus, the vehicle controller may also be adapted to the given up-to-date status even when there is a subsequent change in the vehicle version, e.g., when parts of the equipment are added or removed.

Thus, according to the present invention, the choice of the (version-specific) reduction ratio of the generator, i.e., the reduction factor between the engine rpm and the generator rpm, may be provided through the version code. The choice can thus be made on the basis of vehicle body-specific particulars and/or the engine type (i.e., indirectly).

Figure 2:
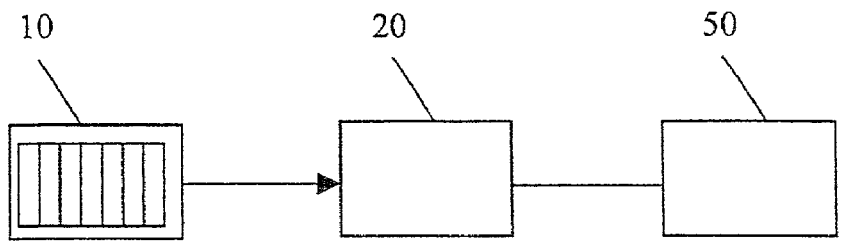
FIG. 2 shows a second embodiment according to the present invention.

FIG. 2 shows another embodiment of the present invention. The individual parameters may be written directly to the memory for the version coding. Data selection is then not necessary. In this case, the memory for the version coding must be designed to be sufficiently large, so that the parameters and/or engine characteristics maps can be entered.

What is claimed is:

1. A vehicle controller designed for a plurality of different vehicle versions, comprising:

means for storing a plurality of control parameters for the different vehicle versions;

means for storing a version coding for customizing the vehicle controller for a predetermined vehicle version, the version coding having a plurality of bit positions; and means for indirect selection of control parameters from the means for storing control parameters by algorithmic processing of values of a plurality of bit positions of the version coding.

2. The vehicle controller according to claim 1, further comprising means for direct selection of control parameters from the means for storing control parameters as a function of values of individual bit positions of the version coding.

3. The vehicle controller according to claim 1, wherein the means for selection is adapted to read control parameters which are contained in the version coding.

4. The vehicle controller according to claim 1, further comprising means for reading control parameters contained in the version coding.

5. The vehicle controller according to claim 1, wherein the control parameters pertain to characteristic values of an electric unit.

6. The vehicle controller according to claim 5, wherein the the electric unit is a generator.

7. A control method for a vehicle controller designed for a plurality of different vehicle versions and having access to a plurality of control parameters for the vehicle versions, the method comprising:

version coding for a vehicle version for customizing the vehicle controller; and selecting control parameters of the vehicle version by algorithmic processing of values of a plurality of bit positions of the version coding.

8. The method according to claim 7, wherein the control parameters of the vehicle version are directly selected as a function of a value of individual bit positions of the version coding.

9. The method according to claim 8, wherein the control parameters. of the vehicle version are contained in the version coding.

10. The method according to claim 7, wherein the control parameters of the vehicle versions are contained in the version coding.

11. The method according to claim 7, wherein the control parameters pertain to characteristic values of an electric unit.

12. The method according to claim 11 wherein the electric unit is a generator.

* * * * *